Figure 6:
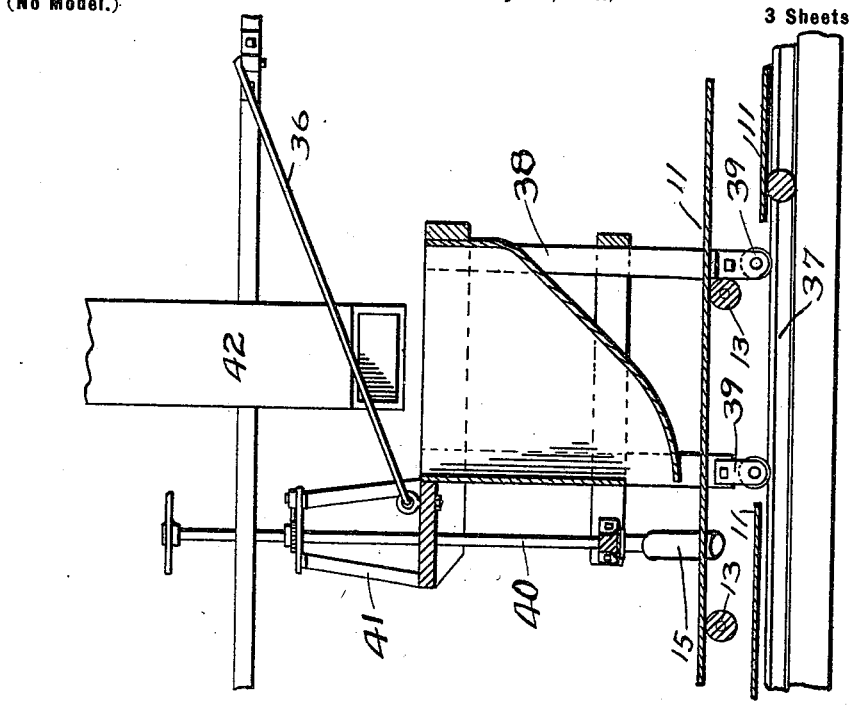

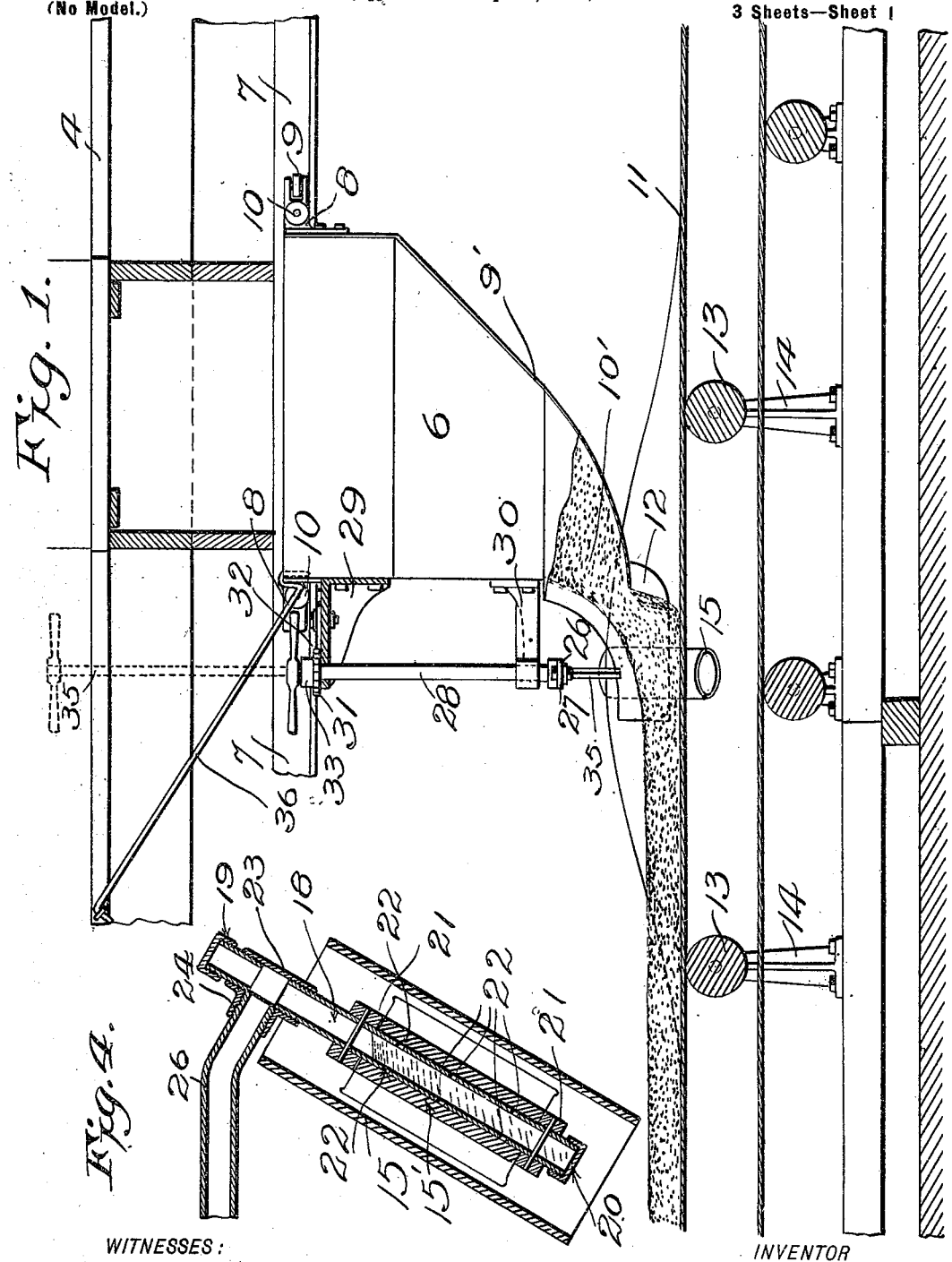

No. 645,946. Patented Mar. 27, 1900.
S. F. EVANS.
CONCENTRATING ROLLS FOR GRAIN CONVEYER BELTS AND MEANS FOR OPERATING SAME.
(Application filed Apr. 12, 1899.)
(No Model.) 3 Sheets—Sheet 2.
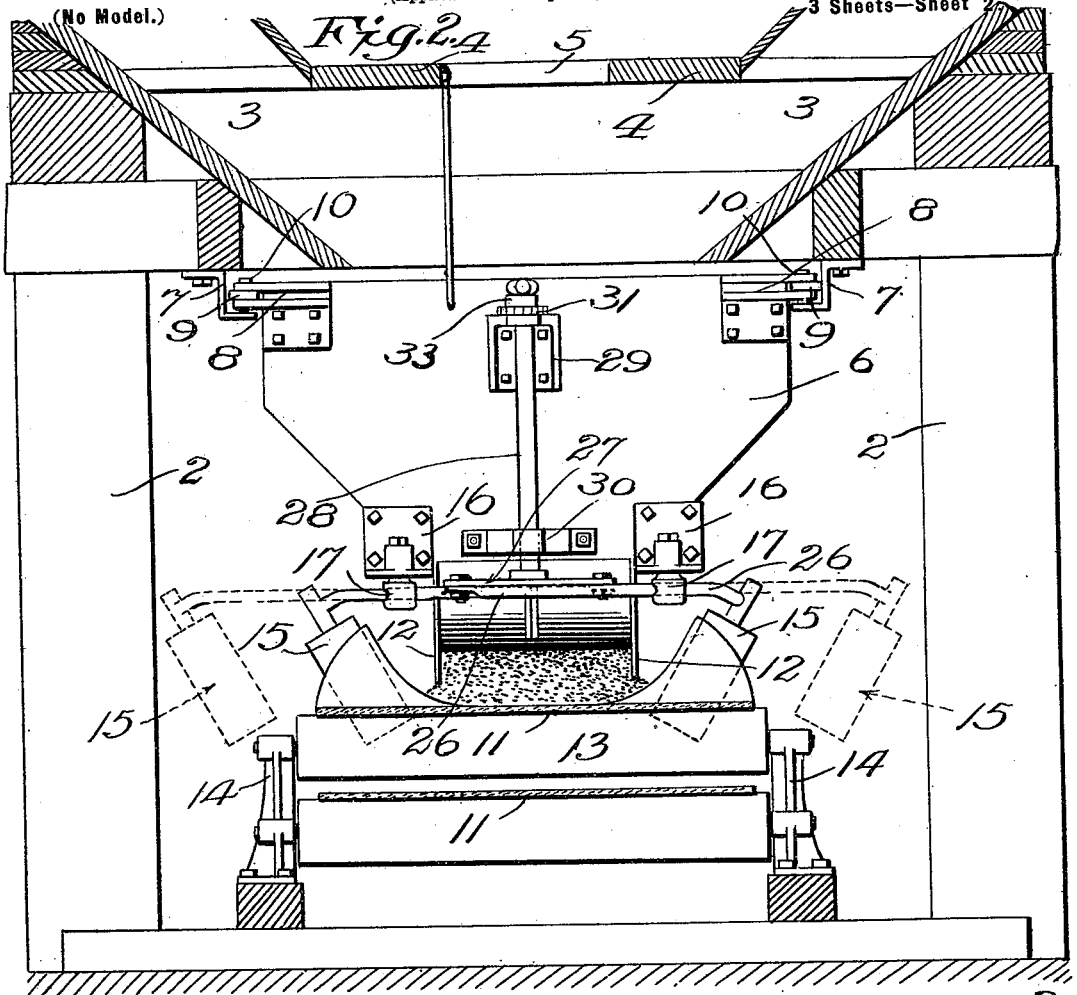
WITNESSES:
C. E. Van Doren
Richard Paul
INVENTOR
Scott F. Evans
BY Paul & Hawley
ATTORNEYS.
THE NORRIS PETERS CO., PHOTO-LITHO., WASHINGTON, D. C.

No. 645,946. Patented Mar. 27, 1900.
S. F. EVANS.
CONCENTRATING ROLLS FOR GRAIN CONVEYER BELTS AND MEANS FOR OPERATING SAME.
(Application filed Apr. 12, 1899.)
(No Model.) 3 Sheets—Sheet 3.

Witnesses
Inventor.
Scott F. Evans
By Paul & Hawley
his attorneys

UNITED STATES PATENT OFFICE.

SCOTT F. EVANS, OF MINNEAPOLIS, MINNESOTA.

CONCENTRATING-ROLLS FOR GRAIN-CONVEYER BELTS AND MEANS FOR OPERATING SAME.

SPECIFICATION forming part of Letters Patent No. 645,946, dated March 27, 1900.

Application filed April 12, 1899. Serial No. 712,703. (No model.)

*To all whom it may concern:*

Be it known that I, SCOTT F. EVANS, of Minneapolis, county of Hennepin, State of Minnesota, have invented certain new and useful Improvements in Concentrating-Rolls for Grain-Conveyer Belts and Means for Operating the Same, of which the following is a specification.

The invention relates to devices for distributing grain in elevators; and the objects of the invention are, first, to provide means for simultaneously raising the edges of a conveyer-belt at the point where the grain is deposited thereon for distribution to prevent the grain from being carried by its own momentum over the edges of the belt as it flows from the hopper or bin; second, to provide means for distributing the grain evenly upon the belt as it flows down from the hopper or bin; third, to provide a movable support for the concentrating-rolls to permit them to be used at any point along the line of the conveyer-belt and beneath any one of the series of bins from which it may be desired to take the grain, and, fourth, to provide means whereby the concentrating-rolls may be moved into or out of engagement with the edges of the belt without the necessity of climbing down into the gallery or passage near the bottom of the bins, where the conveyer and concentrating-rolls are usually located.

The invention consists generally in a conveyer-belt, in combination with concentrating-rolls provided upon either side of said belt and means for simultaneously moving said rolls into or out of engagement with the edges of said belt.

Further, the invention consists in a conveyer-belt, a hopper, concentrating-rolls carried by said hopper, and means for simultaneously moving said rolls into or out of engagement with said belt.

Further, the invention consists in a conveyer-belt, a hopper movable in the gallery or tunnel wherein the conveyer-belt is located, concentrating-rolls carried by said hopper, and means for simultaneously moving said rolls into or out of engagement with said belt.

Further, the invention consists in various constructions and combinations, all as hereinafter described, and particularly pointed out in the claims.

Figure 5:
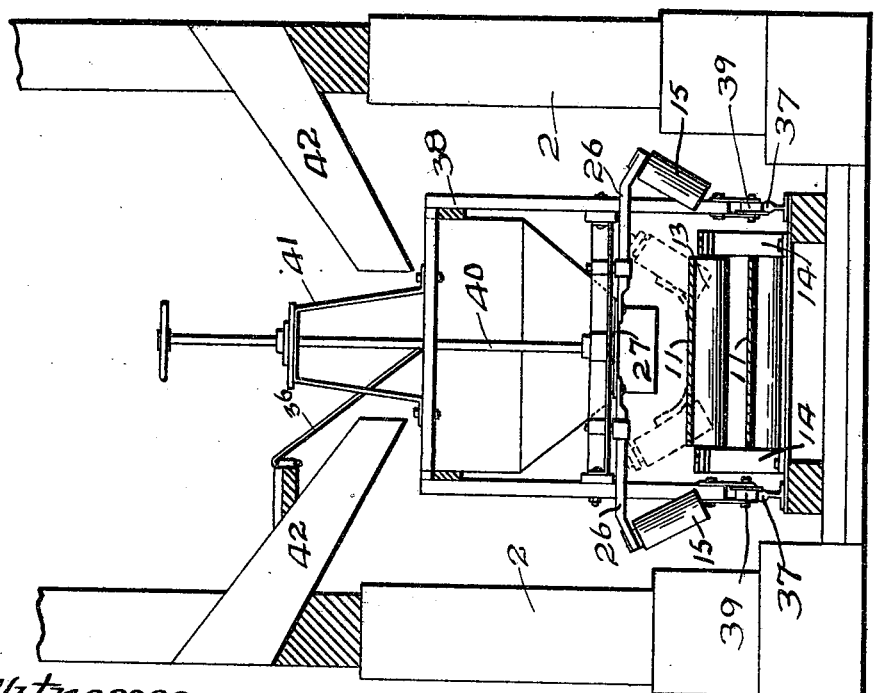

In the accompanying drawings, forming part of this specification, Figure 1 is a longitudinal vertical section of the device embodying my invention. Fig. 2 is a transverse vertical section of the same. Fig. 3 is a detail plan view of the mechanism for operating the rolls, showing the rolls and their operating mechanism in an intermediate position. Fig. 4 is a sectional view of one of the rolls, showing the lubricating means. Fig. 5 is a transverse section through the conveyer-tunnel, showing a modified means for supporting the movable hopper. Fig. 6 is a longitudinal section of the tunnel, showing the construction of the movable hopper.

In the drawings, 2 2 are the upright timbers supporting the bin, 3 3 the spouts leading from the bottom of the bin, and 4 the walk or passage-way between the bins, having a longitudinal central opening 5 to permit access to the hopper and the mechanism for operating the rolls. The hopper 6 is preferably suspended upon the Z-bars 7 7 by brackets 8 8, carrying rollers 9 9 and 10 10, thus rendering the hopper easily movable, and as the bars are preferably secured to the under side of the timbers 8 8 and extend along beneath the bins the hopper is adapted for use with any one of the series. The hopper is preferably provided with a curved bottom 9', which directs the grain to the forward side thereof, where an opening 10' is provided, through which the grain passes and is directed upon the center of the conveyer-belt 11 beneath by the side wings 12 12. The upper run or leg of the conveyer-belt passes over rollers 13 13, which are mounted in bearings in the brackets or standards 14 14, as shown in Figs. 1 and 2.

To prevent the grain from flowing over the edges of the belt at a point where it is deposited thereon, it is necessary to provide means for elevating the edges of the belt for a short distance. I therefore provide the concentrating-rolls 15 15, supported upon the outer ends of pipes or rods 26, which are in turn slidably and revolubly supported in swivels 17 17 on the brackets 16 16, secured to the forward side of the hopper. The hub 15' of each roll 15 is provided with a long bearing-surface for a hollow shaft 18, having caps 19 and 20 upon its opposite ends and held in position in the hub by collars 21, said shaft being preferably provided with a series of small holes or openings 22, through which a lubricating substance may slowly ooze out between the hub and said shaft, thus keeping the bearing constantly lubricated during the rapid rotation of the roll. One end of the shaft 18 preferably projects beyond the upper end of the roll and is provided with a collar 23, having a nipple 24 to receive the threaded end of the pipe or rod 26, which is connected at its opposite end to a link 27.

At a point near the roll a bend is preferably provided in the pipe or rod 26, causing the roll to stand at an acute angle to the main portion of said pipe and to the plane of the conveyer-belt. The roll upon the opposite side of the belt is arranged at substantially the same angle to the belt and is connected to the opposite end of the link 27 in a corresponding manner, said link being secured near its center to the lower end of a hollow upright shaft 28, which is mounted in bearings in the brackets 29 and 30 upon the forward side of the hopper 6. The hollow shaft 28, the rods 26, and the shafts 18 are all preferably of iron pipe. Upon the upper end of the shaft 28 is a ratchet 31, and a pawl 32 upon the upper side of the bracket 29 engages the teeth of said ratchet and locks said shaft. A nut or block 33 is also provided at the top of said shaft 28, having a squared opening to receive the squared shank of the key 35, normally telescoping with the shaft 28, as indicated in full lines in Fig. 2, but when desired may be raised up to the position indicated by dotted lines to permit the operator to change the position of the concentrating-rolls.

I also prefer to provide a locking-rod 36, having a hooked end to engage the top of the hopper, and a staple provided on one of the timbers of the bin, so that the hopper will be held rigidly in position during the operation of delivering the grain upon the belt.

In Figs. 5 and 6 I have shown a modification of the construction shown in Figs. 1 to 4 of the drawings, which consists in providing a track 37 in the bottom of the conveyer gallery or tunnel, whereon a hopper 38, mounted on trucks 39, is adapted to travel. The concentrating-rolls are supported upon the forward end of the hopper in substantially the same manner as heretofore described with reference to Sheets 1 and 2; but instead of providing a collapsible or telescoping mechanism for operating the rolls from a position above the hopper I prefer to provide a rod 40, having its lower end connected to the link 27 and its upper end supported in a bracket 41, mounted upon the frame of the hopper, a suitable ratchet mechanism being provided on said bracket, by means of which the concentrating-rolls and their mechanism may be locked in any desired position. The hopper may be moved along the gallery and stopped at a point opposite the lower end of spouts 42, from which the grain flows into the hopper and thence to the conveyer-belt, the hopper being held in position during the flow of grain by the locking-rod heretofore described.

The operation of my invention is as follows: The hopper having been moved into position beneath the spouts leading from the bin from which it is desired to draw the grain is locked by means of the rod 36, and the operator by means of the key 35 or the rod 40 revolves the link 27 and brings the concentrating-rolls into engagement with the edges of the conveyer-belt, raising up the same at the point where the grain is discharged upon it and preventing the grain from flowing over the edges of the belt until the momentum of the body of grain is overcome and it assumes a position near the middle of the belt, where it will remain without the necessity of elevating the edges. When the bin has been emptied or the desired amount of grain withdrawn therefrom, the flow may be shut off and the position of the link 27 reversed, disengaging the roll from the edges of the belt and moving the same out to the position indicated by dotted lines in Fig. 2 or by full lines by Fig. 5. The hopper may then be moved along over the track to the next point where it is desired to deposit grain upon the conveyer. Obviously any one skilled in matters pertaining to elevator machinery and the apparatus particularly for distributing grain in elevators might make various modifications in the mechanism heretofore described, and I therefore do not confine myself to the details of construction herein set forth.

Having thus described my invention, I claim as new and desire to secure by Letters Patent—

1. The combination, with a moving conveyer-belt, of concentrating-rolls arranged upon each side of said belt and adapted to elevate the edges of the same, and means for simultaneously moving said rolls into or out of engagement with said belt, substantially as described.

2. The combination, with a conveyer-belt, of a movable hopper, concentrating-rolls carried by said hopper upon opposite sides of said belt, and means for simultaneously moving said rolls into or out of engagement with said belt, substantially as described.

3. The combination, with a conveyer-belt, of a hopper supported upon a track above the same, concentrating-rolls carried by said hopper upon opposite sides of said belt, and means for simultaneously moving said rolls into or out of engagement with said belt, substantially as described.

4. The combination, with a conveyer-belt, of concentrating-rolls, rods 18 whereon said rolls are supported, swivels wherein said rods are slidable, the link 27 whereto said rods are connected and means for reversing the ends of said link to move said rolls into or out of engagement with said belt, substantially as described.

5. The combination, with a conveyer-belt, of a hopper movable above the same, rods slidable in swiveled supports upon said hopper, concentrating-rolls provided at the outer ends of said rods, a hollow shaft 28 having a squared upper end, a link carried by said shaft and whereto the inner ends of said rods are pivoted, and a key 35 fitting within said squared end and whereby said hollow shaft is revolved and said link 27 is reversed, substantially as described.

6. The combination, with a grain-bin, of a traveling hopper, the Z-bars whereon said hopper is supported, a conveyer-belt beneath said hopper, concentrating-rolls provided upon opposite sides of said belt, and means extending above said hopper for moving said rolls into or out of engagement with said belt, substantially as described.

7. The combination, with a grain-conveyer belt, of concentrating-rolls, revoluble supports whereon said rolls are slidably supported upon each side of said belt, and means for moving said rolls into or out of engagement with the edges of said belt, substantially as described.

8. The combination, with a grain-conveyer belt, of concentrating-rolls arranged upon each side of said belt, a lever mechanism operating in a horizontal plane for moving said rolls into or out of engagement with said belt, and means for locking said lever mechanism to hold said rolls in place, substantially as described.

9. The combination, with a grain-conveyer belt, of concentrating-rolls arranged upon each side of said belt and at an angle thereto and means for moving said rolls simultaneously into or out of engagement with the edges of said belt and means preventing the accidental disengagement of said rolls from said belt.

10. The combination, with a grain-conveyer belt, of concentrating-rolls supported upon each side of said belt at an angle thereto, a link-and-lever mechanism connected with said rolls and operating in a horizontal plane to move said rolls into or out of engagement with the edges of said belt, and means for locking said link-and-lever mechanism to hold said rolls in place, substantially as described.

11. The combination, with a conveyer-belt, of concentrating-rolls supported above the same and depending upon each side thereof, and means for moving said rolls into engagement with said belt to elevate the edges thereof, substantially as described.

12. The combination, with a grain-conveyer belt, of concentrating-rolls provided upon each side thereof and supported above the same, and means for moving said rolls in a horizontal plane into engagement with the said belt to elevate the edges thereof, substantially as described.

13. The combination, with a conveyer-belt, of concentrating-rolls supported above and depending upon each side of said belt at an acute angle to the plane thereof, and means for moving said rolls in a horizontal plane into engagement with said belt to elevate its edges, substantially as described.

14. The combination, with a conveyer-belt, of concentrating-rolls supported above and depending upon each side thereof, and means for moving said rolls into engagement with said belt to elevate its edges or out of engagement with the same to permit it to return to its normal position.

15. The combination, with a grain-conveyer belt, of concentrating-rolls slidably supported upon each side of said belt at an acute angle thereto, and means for sliding said rolls toward or from said belt whereby the pitch or slant of said rolls with respect to the plane of said belt will be the same when they are at the limit of either their inner or outer stroke, substantially as described.

16. The combination, with a grain-conveyer belt, of concentrating-rolls slidably supported upon each side of the same, a mechanism for sliding said rolls toward or from said belt, and means for locking said mechanism when said rolls are at the limit of their stroke in either direction, substantially as described.

17. The combination, with a conveyer-belt, of a movable hopper, concentrating-rolls carried thereby upon the opposite side of the belt, a mechanism for moving said rolls toward said belt to elevate its edges, and means for locking said mechanism, substantially as described.

In witness whereof I have hereunto set my hand this 5th day of April, 1899.

SCOTT F. EVANS.

In presence of—
  RICHARD PAUL,
  M. C. NOONAN.